(12) United States Patent
Lee et al.

(10) Patent No.: US 8,554,001 B2
(45) Date of Patent: Oct. 8, 2013

(54) IMAGE ENCODING/DECODING SYSTEM USING GRAPH BASED PIXEL PREDICTION AND ENCODING SYSTEM AND METHOD

(75) Inventors: Jaejoon Lee, Seoul (KR); HoCheon Wey, Seongnam-si (KR); Godwin Shen, Los Angeles, CA (US); Woo-Shik Kim, Los Angeles, CA (US); Antonio Ortega, Los Angeles, CA (US)

(73) Assignees: Samsung Electronics Co., Ltd., Suwon-Si (KR); University of Southern California, Los Angeles, CA (US)

( * ) Notice: Subject to any disclaimer, the term of this patent is extended or adjusted under 35 U.S.C. 154(b) by 202 days.

(21) Appl. No.: 13/016,373

(22) Filed: Jan. 28, 2011

(65) Prior Publication Data

US 2011/0206288 A1   Aug. 25, 2011

Related U.S. Application Data

(60) Provisional application No. 61/303,826, filed on Feb. 12, 2010.

(30) Foreign Application Priority Data

Mar. 2, 2010 (KR) .................. 10-2010-0018720

(51) Int. Cl.
G06K 9/36 (2006.01)
G06K 9/46 (2006.01)

(52) U.S. Cl.
USPC .......................... 382/233; 382/238

(58) Field of Classification Search
USPC ............. 382/232, 233, 236, 238, 243; 375/240.03, 240.08, 240.24, 240.27, 375/E07.2
See application file for complete search history.

(56) References Cited

U.S. PATENT DOCUMENTS

| | | | | |
|---|---|---|---|---|
| 5,978,514 A * | 11/1999 | Yamaguchi et al. | ........... | 382/243 |
| 6,173,077 B1 * | 1/2001 | Trew et al. | ..................... | 382/236 |
| 2010/0278232 A1 * | 11/2010 | Yea et al. | .................. | 375/240.08 |
| 2010/0303150 A1 * | 12/2010 | Hsiung et al. | ............. | 375/240.08 |
| 2011/0075729 A1 * | 3/2011 | Dane et al. | ................ | 375/240.03 |
| 2011/0206288 A1 * | 8/2011 | Lee et al. | ...................... | 382/233 |

\* cited by examiner

Primary Examiner — Amir Alavi
(74) Attorney, Agent, or Firm — Staas & Halsey LLP

(57) ABSTRACT

An encoding system may generate an edge map based on a pixel value difference between neighboring pixels in an inputted image, generate a graph by connecting pixels using the generated edge map, select a prediction value for at least one pixel based on the generated graph, and encode an image based on the selected prediction value.

8 Claims, 9 Drawing Sheets

300

IMAGE ENCODING/DECODING SYSTEM USING GRAPH BASED PIXEL PREDICTION AND ENCODING SYSTEM AND METHOD

CROSS-REFERENCE TO RELATED APPLICATIONS

This application claims the benefit under 35 U.S.C. §119 (e) of a U.S. Provisional Application No. 61/303,826, filed on Feb. 12, 2010, in the U.S. patent and Trade Mark Office, and the benefit under 35 U.S.C. §119(a) of a Korean Patent Application No. 10-2010-0018720, filed on Mar. 2, 2010, in the Korean Intellectual Property Office, the entire disclosures of which are incorporated herein by reference for all purposes.

BACKGROUND

1. Field

One or more embodiments relate to an image encoding/decoding system and method using graph-based pixel prediction, and a depth map encoding system and method.

2. Description of the Related Art

In a case of encoding images including a moving picture, a method of performing a prediction-encoding on the images using pixels neighboring a pixel to be encoded has been used. For example, when an image of a single frame is divided into blocks each having a pixel size of 4×4 in an H.264 of a digital video codec standard, a pixel value of a current block may be predicted, in a case of encoding a single block, using a pixel value of each of neighboring blocks adjacent to the current block, and a difference between the predicted pixel value and the pixel value of the current block may be encoded, thereby improving compression efficiency.

In the above described conventional art, since the pixel value of the current block may not be accurately predicted only using the pixel value of each of the neighboring blocks, shape information of the current block may be additionally provided so that the pixel value of the current block may be more accurately predicted. For example, when encoding a depth map having three-dimensional (3D) depth information of an image, a method where the current block is divided into two regions using a single line, and a representative value of each of the two regions is encoded may be used.

Accordingly, there is a demand for a system and method for effectively encoding and decoding an image.

SUMMARY

According to an aspect of one or more embodiments, there may be provided an encoding system, including: an edge map generation unit to generate an edge map based on a pixel value difference between neighboring pixels in an inputted image; a graph generation unit to generate a graph by connecting pixels through the generated edge map; a prediction value selection unit to select a prediction value for at least one pixel based on the generated graph; and a prediction encoding unit to perform a prediction encoding on the at least one pixel based on the at least one pixel and the prediction value.

When the pixel value difference is equal to or more than a predetermined threshold value, the edge map generation unit may determine that an edge between the neighboring pixels exists, and mark, on the edge map, a value corresponding to a determined result to generate the edge map.

The threshold value may be adjusted when generating the edge so that an edge generated amount is adjusted in accordance with a target bit rate of the inputted image to adjust a bit rate of an encoded edge map.

The encoding system may further include an edge map encoding unit to encode the generated edge map. The edge map encoding unit may encode the edge map by compressing the edge map using a binary arithmetic encoding scheme, and the encoded edge map may be included in a bit string obtained by encoding the inputted image.

The graph generation unit may generate the graph by connecting a plurality of pixels being inseparable from each other by an edge of the edge map.

According to another aspect of one or more embodiments, there may be provided an encoding method, including: generating an edge map based on a pixel value difference between neighboring pixels in an inputted image; generating a graph by connecting pixels through the generated edge map; selecting a prediction value for at least one pixel based on the generated graph; and performing a prediction encoding on the at least one pixel based on the at least one pixel and the prediction value.

According to another aspect of one or more embodiments, there may be provided a decoding system, including: an edge map decoding unit to decode an edge map in an inputted bit string; a graph generation unit to generate a graph by connecting pixels through the decoded edge map; a prediction value selection unit to select a prediction value for at least one pixel based on the generated graph; and a prediction compensation unit to restore the at least one pixel based on the prediction value and pixel information of the inputted bit string.

According to still another aspect of one or more embodiments, there may be provided a decoding method, including: decoding an edge map from an inputted bit string; generating a graph by connecting pixels through the decoded edge map; selecting a prediction value for at least one pixel based on the generated graph; and restoring the at least one pixel based on the prediction value and pixel information of the inputted bit string (stream).

According to yet another aspect of one or more embodiments, there may be provided a depth map encoding method, including: predicting, based on a depth map and a reference image, an image quality of an image to be synthesized using the depth map; and selecting an encoding mode based on the predicted image quality.

According to further aspect of one or more embodiments, there may be provided a depth map encoding system, including: an image quality prediction unit to predict, based on a depth map and a reference image, an image quality of an image to be synthesized using the depth map; and an encoding mode selection unit to select an encoding mode based on the predicted image quality.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
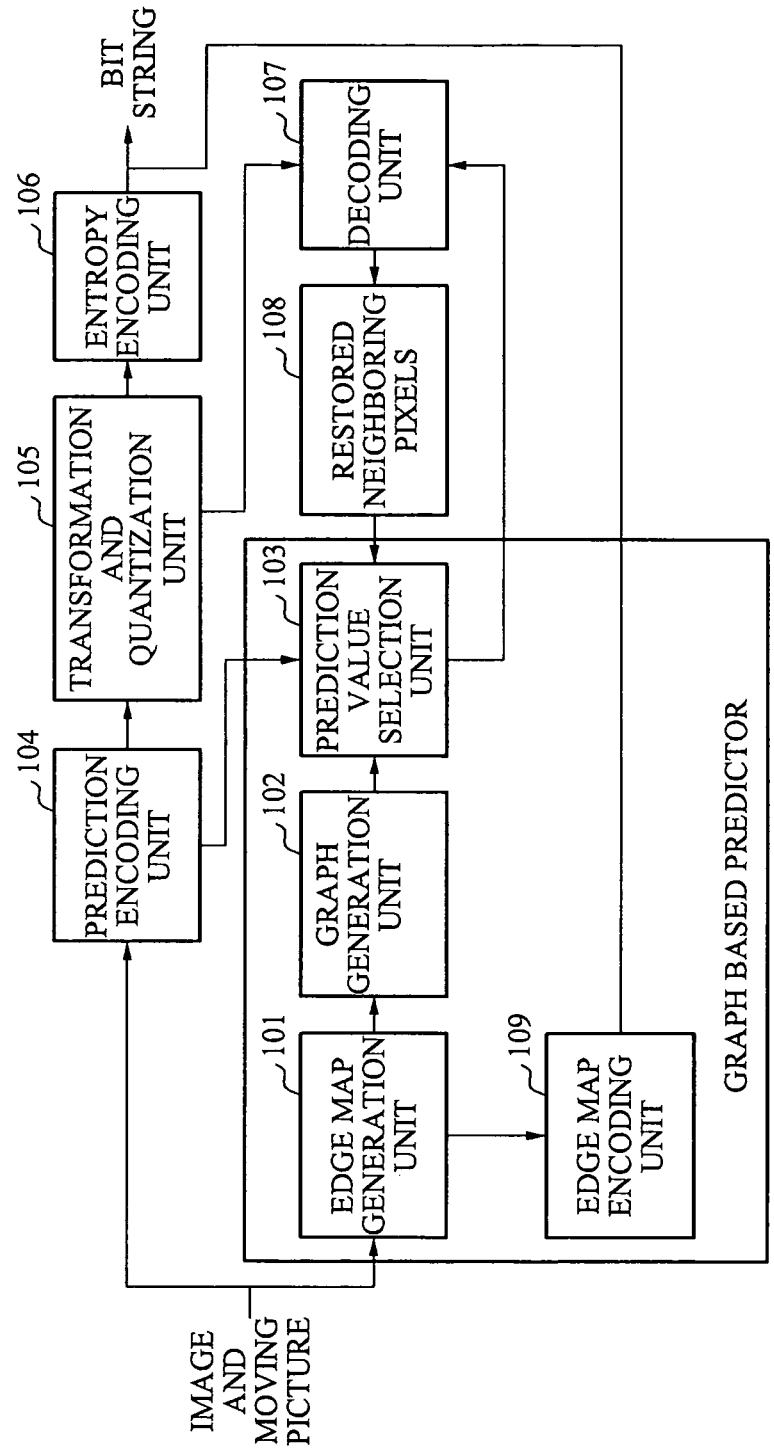
FIG. 1 is a block diagram illustrating an internal configuration of an encoding system according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 is a block diagram illustrating an internal configuration of an encoding system according to an embodiment.

As illustrated in FIG. 1, the encoding system may include an edge map generation unit 101, a graph generation unit 102, a prediction value selection unit 103, a prediction encoding unit 104, a transformation and quantization unit 105, an entropy encoding unit 106, a decoding unit 107, and an edge map encoding unit 109.

The edge map generation unit 101 may generate an edge map based on a pixel value difference between neighboring pixels in an inputted image. In this instance, when the pixel value difference is equal to or more than a predetermined threshold value, the edge map generation unit 101 may determine that an edge between the neighboring pixels exists, and mark, on the edge map, a value corresponding to a determined result to generate the edge map. Also, when the pixel value difference is less than the predetermined threshold value, the edge map generation unit 101 may determine that the edge between the neighboring pixels does not exist, and mark, on the edge map, a value corresponding to a determined result to generate the edge map. For example, when the edge is determined to exist, '1' may be applied to a corresponding position of the edge map, and when the edge is determined not to exist, '0' may be applied to a corresponding position of the edge map. Here, the threshold value may be adjusted when generating the edge so that an edge generated amount is adjusted in accordance with a target bit rate of the inputted image to adjust a bit rate of an encoded edge map.

The graph generation unit 102 may generate a graph by connecting pixels through the generated edge map. In this instance, the graph generation unit 102 may generate the graph by connecting a plurality of pixels being inseparable from each other by an edge of the edge map. Specifically, when an edge exists between the two neighboring pixels based on the edge map, the graph generation unit 102 may not connect two neighboring pixels to generate the graph, and when the edge does not exist between the two neighboring pixels, the graph generation unit 102 may connect the neighboring pixels to generate the graph.

In this instance, the graph may be expressed as the following Equation 1.

$$G = (V, E) \quad \text{[Equation 1]}$$

Here, 'G' denotes a graph, 'V' denotes pixels of an image, and 'E' denotes a connection between the pixels. In this case, when a pixel of a position (i, j) and a pixel of a position (i', j'') are connected to each other, the connection between the pixels may be represented as the following Equation 2.

$$[(i,j),(i',j')] \in E \quad \text{[Equation 2]}$$

Here, directivity between the connected pixels may not be denoted.

When the inputted image is classified into blocks each having a predetermined pixel size and the blocks are encoded, each of the blocks may be divided into a plurality of regions by a corresponding graph. Specifically, mutually connected pixels may generate a single path to form a single region.

The prediction value selection unit 103 may select a prediction value for at least one pixel based on the generated graph. In this instance, the prediction value selection unit 103 may select, as the prediction value, a pixel value of a pixel neighboring a block including the at least one pixel and closest to the at least one pixel from among pixels connected to the at least one pixel by the graph.

According to another embodiment, the prediction value selection unit 103 may assign mutually different weights to pixel values of pixels connected to the at least one pixel by the graph, and may select, as the prediction value, an operation result between the pixel values where the mutually different weights are assigned. In this instance, the pixels connected to the at least one pixel by the graph may neighbor a block including the at least one pixel.

A selection process of the prediction value described above will be further described with reference to FIG. 3.

In this instance, the weights may be determined based on a spectral distribution of the graph.

The prediction value selection unit 103 may calculate an eigenvector of a Laplacian matrix of the graph for the purpose of using the spectral distribution, and determine the weights based on the eigenvector. For example, when calculating a Laplacian matrix from the graph, and then calculating an eigenvector, the spectral distribution may be obtained. In this instance, a higher frequency may be obtained in an increased order of the eigenvector. Here, when setting, as x, a pixel value of a pixel desired to be predicted, and generating a vector represented as Equation 3 below, the pixel value x desired to be predicted may be obtained using Equation 4 below.

$$V = [x\ a_2\ a_3\ \ldots\ a_N]^T \quad \text{[Equation 3]}$$

$$x^* = \underset{x}{\operatorname{argmin}} \sum_{i=k}^{N-1} e_i^T \cdot V \quad \text{[Equation 4]}$$

In Equations 3 and 4, 'e' denotes an eigenvector, '$a_2\ a_3\ \ldots\ a_N$' denotes pixel values of pixels neighboring a block including a pixel desired to be predicted, 'T' denotes a transposing operation, and an operator '•' denotes a vector inner-product operator.

According to another embodiment, the prediction value selection unit 103 may substitute, in a plane equation, pixel values that neighbor a block including at least one pixel and are connected by a graph or pixel values where mutually different weights are applied, and select an obtained plane value as the prediction value.

In this instance, to obtain the prediction value suitable for each of the plurality of regions, pixel values of decoded pixels may be used as the pixel values of the pixels neighboring the block. By using the pixel values of the decoded pixels, it may be possible to enable encoded pixels to be restored using identical information even in a decoding system that will be described later. A method of using the pixel values of the decoded pixels neighboring the block will be further described later.

The prediction encoding unit 104 may perform a prediction encoding on at least one pixel based on the at least one pixel and the prediction value. In this instance, the prediction encoding unit 104 may encode a difference value between a pixel value of the at least one pixel and the prediction value.

The transformation and quantization unit 105 may transform and quantize the pixel where the prediction encoding is performed. Specifically, the encoded difference values with respect to the block may be lossy compressed through a transformation and a quantization, such as Discrete Cosine Transform (DCT).

The entropy encoding unit 106 may perform an entropy encoding on the transformed and quantized pixel to generate a bit string. In this instance, the entropy encoding unit 106 may compress, into a bit string, pixel values of the transformed and quantized pixels, that is, transformed and quantized difference values through the entropy encoding, such as a Huffman encoding or an arithmetic encoding.

The decoding unit 107 may decode the transformed and quantized pixel based on the prediction value. In this instance, restored neighboring pixels may denote the above described decoded pixels. Specifically, in the prediction value selection unit 103, pixel values of corresponding restored neighboring pixels from the decoding unit 107 may be used as the pixel values of the pixels neighboring the block including the at least one pixel. As described above, by using the restored neighboring pixels in the selection process of the prediction value, it may be possible to enable an encoded pixel to be restored using identical information even in the decoding system.

The edge map encoding unit 109 may encode the generated edge map. In this instance, the edge map encoding unit 109 may encode the edge map using a binary arithmetic encoding method. In this manner, the encoded edge map may be included in the above described bit string where the inputted image is encoded.

Figure 2:
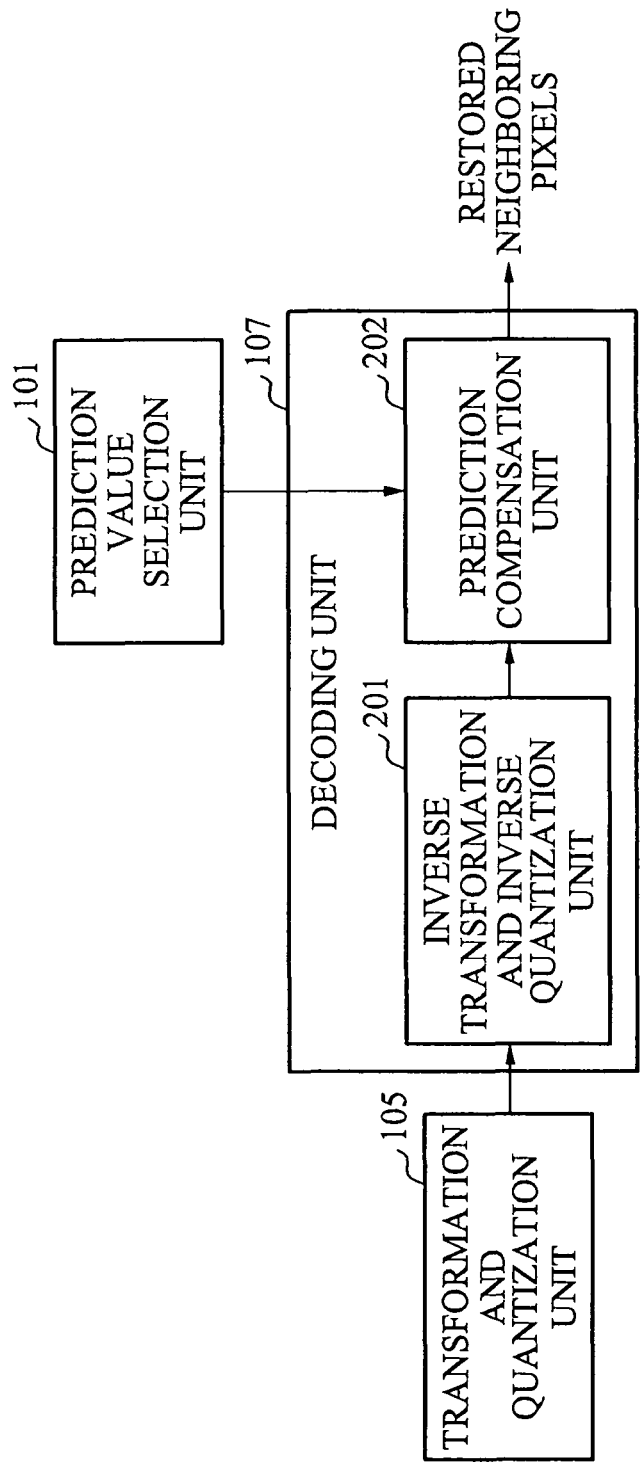
FIG. 2 is a block diagram illustrating an internal configuration of a decoding unit according to an embodiment.

FIG. 2 is a block diagram illustrating an internal configuration of a decoding unit according to an embodiment. As illustrated in FIG. 2, the decoding unit 107 includes an inverse-transformation and inverse-quantization unit 201 and a prediction compensation unit 202.

The inverse-transformation and inverse-quantization unit 201 may inverse-transform and inverse-quantize the transformed and quantized values obtained by the transformation and quantization unit 105.

Also, the prediction compensation unit 202 may restore pixels by applying, to the inverse-transformed and inverse-quantized values, the prediction value selected in the prediction value selection unit 103. The reason why the pixels are restored may be because encoded pixel may be restored using identical information even in the decoding system, by selecting the prediction value using the pixel values of the restored pixels in the prediction value selection unit 103.

Figure 3:
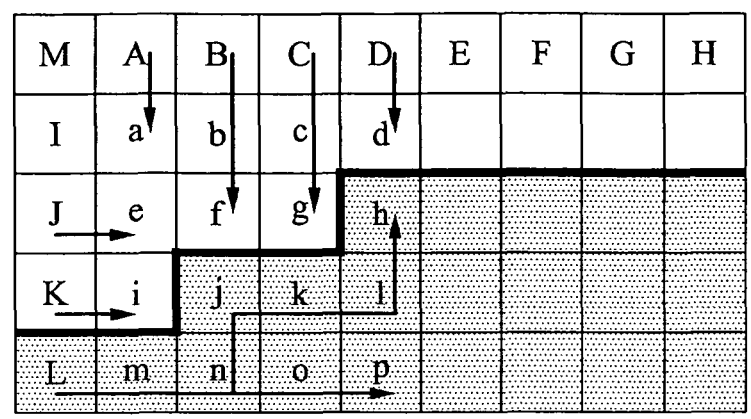
FIG. 3 illustrates an example of pixels of an image according to an embodiment.

FIG. 3 illustrates an example of pixels of an image according to an embodiment. An image 300 may illustrate a plurality of pixels, and each of alphabets including uppercase and lowercase letters may denote a pixel. In FIG. 3, pixels from 'a' to 'p' may include a single block having a pixel size of 4×4. Also, in FIG. 3, the pixels may be separated into two regions by an edge, that is, a bold line of the image 300. Specifically, by the edge, pixels 'a', 'b', 'c', 'd', 'e', 'f', 'g', and 'i' and pixels 'h', 'j', 'k', 'l', 'm', 'n', 'o', and 'p' may be separated from each other. In this instance, as a prediction value for each of 'h', 'j', 'k', 'l', 'm', 'n', 'o', and 'p', a pixel value of a pixel 'L' that neighbors a corresponding block and is closest to a corresponding pixel from among pixels connected to the corresponding pixel by a graph may be selected. Also, as a prediction value for each of 'a', 'b', 'c', 'd', 'e', 'f', 'g', and 'i', a pixel value of a pixel that neighbors a corresponding block and is closest to a corresponding pixel from among pixels connected to the corresponding pixel by a graph may be respectively selected. For example, a pixel value of the pixel 'B' may be used as a prediction value for the pixel b, and a pixel value of the pixel 'C' may be used as a prediction value of each of the pixels 'c' and 'g'. In a case where a plurality of closest pixels such as the pixels 'a' and 'f' exist, a priority may be applied to a pixel existing in a specific direction. In FIG. 3, a pixel value of the pixel positioned in an upper end of the image 300 may be selected as the prediction value. In this instance, the pixel value of the selected pixel may be directly used as the prediction value, however, when the selected pixel is connected to the plurality of pixels described in FIG. 1, mutually different weights may be applied to the pixel values of the connected plurality of pixels, and a sum of the pixel values where the weights are applied may be used as the prediction value. For example, the pixels 'a', 'b', 'c', 'd', 'e', 'f', 'g', and 'i' within the block having the pixel size of 4×4 may be included in a single path of a graph, and may be connected to the pixels 'A', 'B', 'C', 'D', 'I', 'J', and 'K' neighboring the block. In this instance, when obtained weights for each of the pixels 'A', 'B', 'C', 'D', 'I', 'J', and 'K' are w_A, w_B, w_C, w_D, w_I, w_J, and w_K, the prediction value of the pixel 'a' may be obtained using the following Equation 5.

$$a\_pred = A*w\_A + B*w\_B + C*w\_C + D*w\_D + I*w\_I + J*w\_J + K*w\_K \qquad \text{[Equation 5]}$$

Here, 'a_pred' denotes the prediction value of the pixel 'a'.

Figure 4:
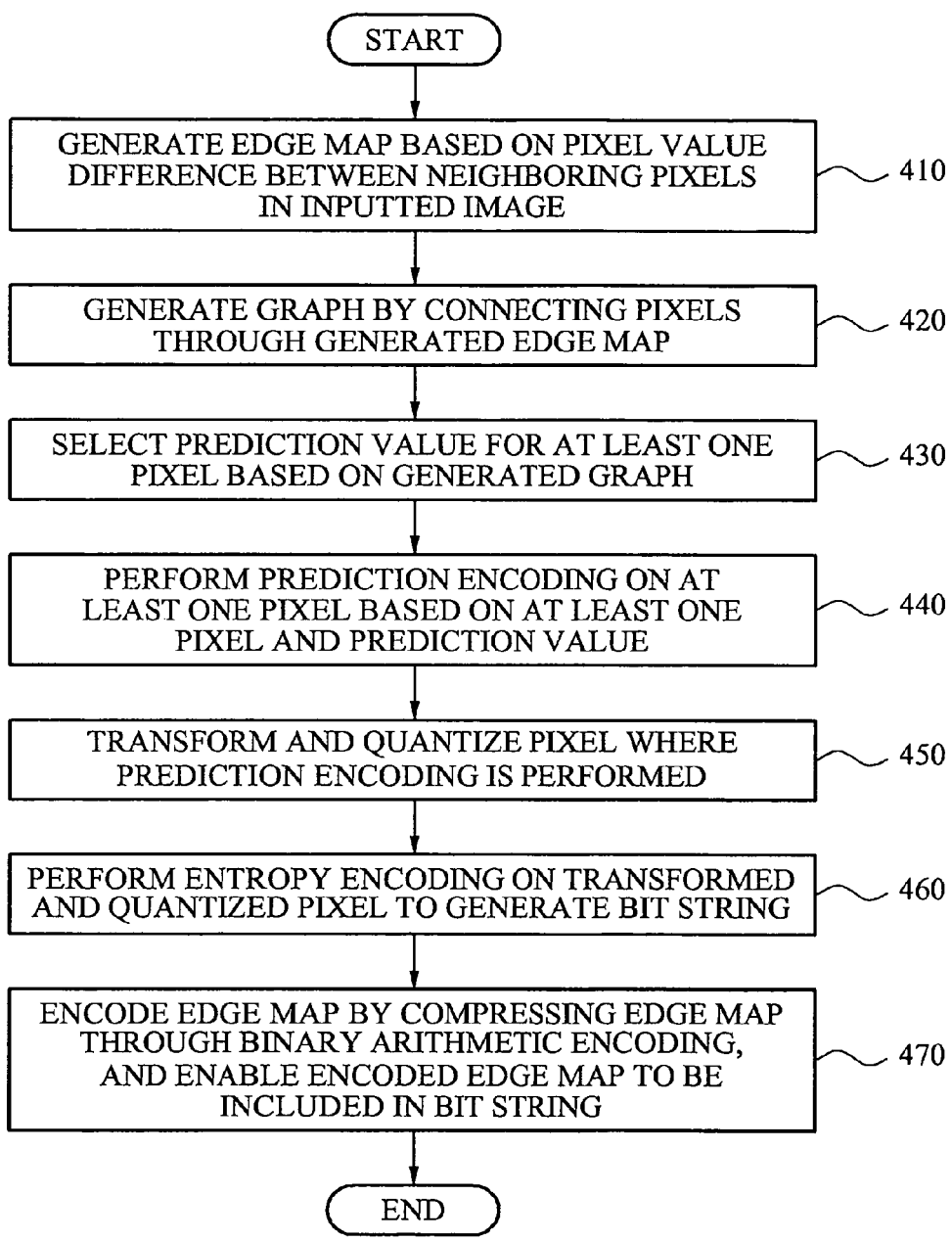
FIG. 4 is a flowchart illustrating an encoding method according to an embodiment.

FIG. 4 is a flowchart illustrating an encoding method according to an embodiment. The encoding method may be performed by the encoding system of FIG. 1. The encoding method will be described based on a process where each of the operations is performed by the encoding system.

In operation 410, the encoding system may generate an edge map based on a pixel value difference between neighboring pixels in an inputted image. In this instance, when the pixel value difference is equal to or more than a predetermined threshold value, the encoding system may determine that an edge between the neighboring pixels exists, and mark, on the edge map, a value corresponding to a determined result to generate the edge map. Also, when the pixel value difference is less than the predetermined threshold value, the encoding system may determine that the edge between the neighboring pixels does not exist, and mark, on the edge map, a value corresponding to a determined result to generate the edge map. For example, when the edge is determined to exist, '1' may be applied to a corresponding position of the edge map, and when the edge is determined not to exist, '0' may be applied to a corresponding position of the edge map. Here, the threshold value may be adjusted when generating the edge so that an edge generated amount is adjusted in accordance with a target bit rate of the inputted image to adjust a bit rate of an encoded edge map.

In operation 420, the encoding system may generate a graph by connecting pixels through the generated edge map. In this instance, the encoding system may generate the graph by connecting a plurality of pixels being inseparable from each other by an edge of the edge map. Specifically, when an edge exists between the two neighboring pixels based on the edge map, the encoding system may not connect two neighboring pixels to generate the graph, and when the edge does not exist between the two neighboring pixels, the encoding system may connect the neighboring pixels to generate the graph.

In this instance, as an example, the graph may be expressed as Equation 1 described above.

When the inputted image is classified into blocks each having a predetermined pixel size and the blocks are encoded, each of the blocks may be divided into a plurality of regions by a corresponding graph. Specifically, mutually connected pixels may generate a single path to form a single region.

In operation 430, the encoding system may select a prediction value for at least one pixel based on the generated graph. In this instance, the encoding system may select, as the prediction value, a pixel value of a pixel neighboring a block including the at least one pixel and closest to the at least one pixel from among pixels connected to the at least one pixel by the graph.

According to another embodiment, the encoding system may assign mutually different weights to pixel values of pixels connected to the at least one pixel by the graph, and may select, as the prediction value, an operation result between the pixel values where the mutually different weights are assigned. In this instance, the pixels connected to the at least one pixel by the graph may neighbor a block including the at least one pixel.

In this instance, the weights may be determined based on a spectral distribution of the graph.

The encoding system may calculate an eigenvector of a Laplacian matrix of the graph for the purpose of using the spectral distribution, and determine the weights based on the eigenvector. For example, when calculating a Laplacian matrix from the graph, and then calculating an eigenvector, the spectral distribution may be obtained. In this instance, a higher frequency may be obtained in an increased order of the eigenvector. Here, when setting, as x, a pixel value of a pixel desired to be predicted, and generating a vector represented as Equation 3 described above, the pixel value x desired to be predicted may be obtained using Equation 4 described above.

According to another embodiment, the encoding system may substitute, in a plane equation, pixel values that neighbor a block including at least one pixel and are connected by a graph or pixel values where mutually different weights are applied, and select an obtained plane value as the prediction value.

In this instance, to obtain the prediction value suitable for each of the plurality of regions, pixel values of decoded pixels may be used as the pixel values of the pixels neighboring the block. By using the pixel values of the decoded pixels, it may be possible to enable encoded pixels to be restored using identical information even in a decoding system that will be described later. A method of using the pixel values of the decoded pixels neighboring the block will be further described later.

In operation 440, the encoding system may perform a prediction encoding on at least one pixel based on the at least one pixel and the prediction value. In this instance, the encoding system may encode a difference value between a pixel value of the at least one pixel and the prediction value.

In operation 450, the encoding system may transform and quantize the pixel where the prediction encoding is performed. Specifically, the encoded difference values with respect to the block may be lossy compressed through a transformation and a quantization such as a DCT.

In operation S460, the encoding system may perform an entropy encoding on the transformed and quantized pixel to generate a bit string. In this instance, the entropy encoding unit 106 may compress, into a bit string, pixel values of the transformed and quantized pixels, that is, transformed and quantized difference values through the entropy encoding such as a Huffman encoding or an arithmetic encoding.

In operation 470, the encoding system may encode the generated edge map. In this instance, the encoding system may encode the edge map using a binary arithmetic encoding scheme. In this manner, the encoded edge map may be included in the above described bit string where the inputted image is encoded.

The encoding system may decode the transformed and quantized pixel based on the prediction value. Specifically, in operation 430, the encoding system may use pixel values of corresponding restored neighboring pixels as the pixel values of the pixels neighboring the block including the at least one pixel. As described above, by using the restored neighboring pixels in the selection process of the prediction value, it may be possible to enable an encoded pixel to be restored using identical information even in a decoding method.

Figure 5:
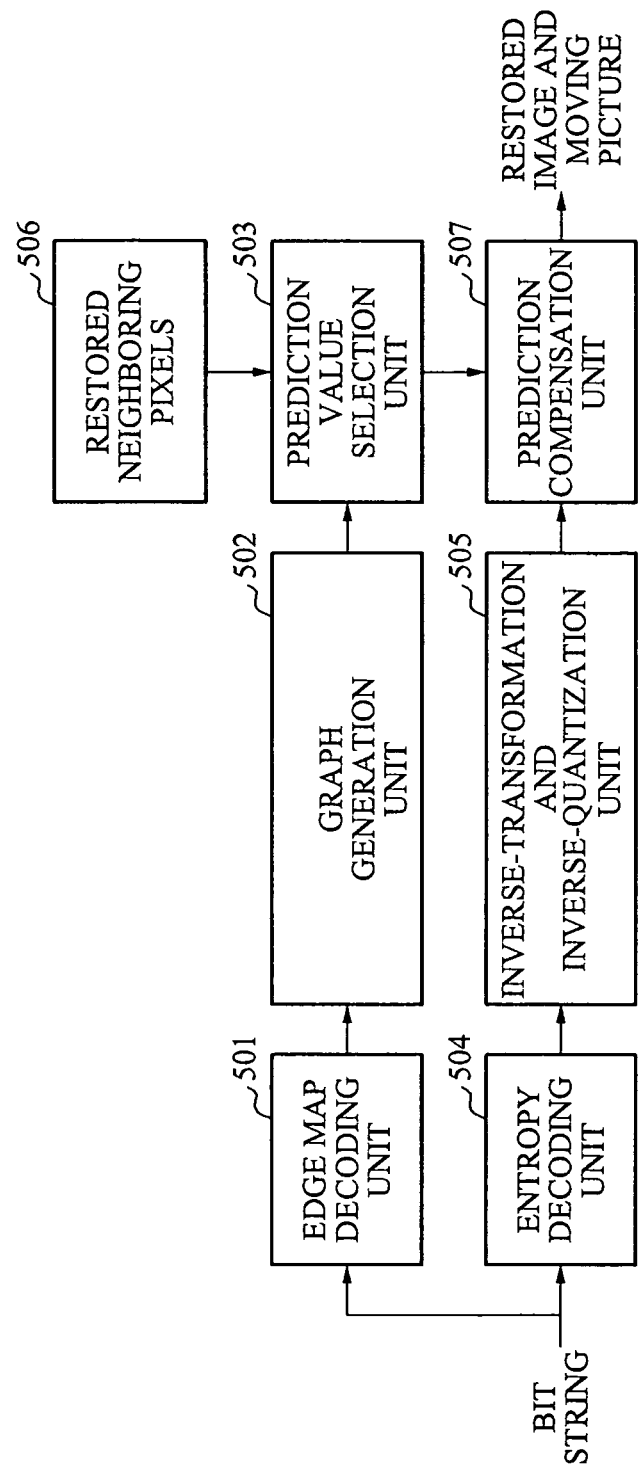
FIG. 5 is a block diagram illustrating an internal configuration of a decoding system according to an embodiment.

FIG. 5 is a block diagram illustrating a decoding system according to an embodiment. The decoding system includes an edge map decoding unit 501, a graph generation unit 502, a prediction value selection unit 503, an entropy decoding unit 504, an inverse-transformation and inverse-quantization unit 505, and a prediction compensation unit 507.

The edge map decoding unit 501 may decode an edge map from an inputted bit string. In this instance, the edge map decoding unit 501 may decode the edge map from the inputted bit string using a binary arithmetic decoding method.

The graph generation unit 502 may generate a graph by connecting pixels through the decoded edge map. In this instance, the graph generation unit 502 may generate the graph by connecting a plurality of pixels being inseparable from each other by an edge of the edge map. Specifically, the method of generating the graph may be the same as those of FIG. 1 and FIG. 4.

The prediction value selection unit 503 may select a prediction value for at least one pixel based on the generated graph. In this instance, an image corresponding to the inputted bit string may be classified into blocks each having a predetermined pixel size, and the prediction value selection unit 503 may select, as the prediction value, a pixel value of a pixel neighboring a block including the at least one pixel and closest to the at least one pixel from among pixels connected to the at least one pixel by the graph. Alternatively, the prediction value selection unit 503 may assign mutually different weights to pixel values of pixels connected to the at least one pixel by the graph, and may select, as the prediction value, an operation result between the pixel values where the mutually different weights are assigned. In this instance, the pixels connected to the at least one pixel may neighbor a block including the at least one pixel. Specifically, the method of selecting the prediction value may be the same as those of FIGS. 1 and 4.

The entropy decoding unit 504 may perform an entropy decoding on the inputted bit string to decode a pixel, and the inverse-transformation and inverse-quantization unit 505 may inverse-transform and inverse-quantize the pixel where the entropy decoding is performed. Specifically, the decoding system may restore an original pixel value prior to the entropy encoding, the transformation, and the quantization described in FIGS. 1 and 4 by performing the entropy decoding, the inverse-transformation, and the inverse-quantization on the inputted bit string.

In this instance, the prediction value selection unit 503 may select a prediction value for the at least one pixel based on the pixels neighboring a block including the at least one pixel from among the inverse-transformed and inverse-quantized pixels and based on the graph. Specifically, as the pixels neighboring the block, corresponding pixels from among the inverse-transformed and the inverse-quantized pixels may be used. Here, the restored neighboring pixels of FIG. 5 may denote the pixels neighboring the block including the at least one pixel from among the inverse-transformed and inverse-quantized pixels.

The prediction compensation unit 507 may restore the at least one pixel based on the prediction value and pixel information of the inputted bit string. Specifically, the pixel information of the bit string may be a value including a difference value between an original pixel value and the prediction value, and the prediction compensation unit 507 may add the prediction value to the difference value, thereby restoring the at least one pixel.

Figure 6:
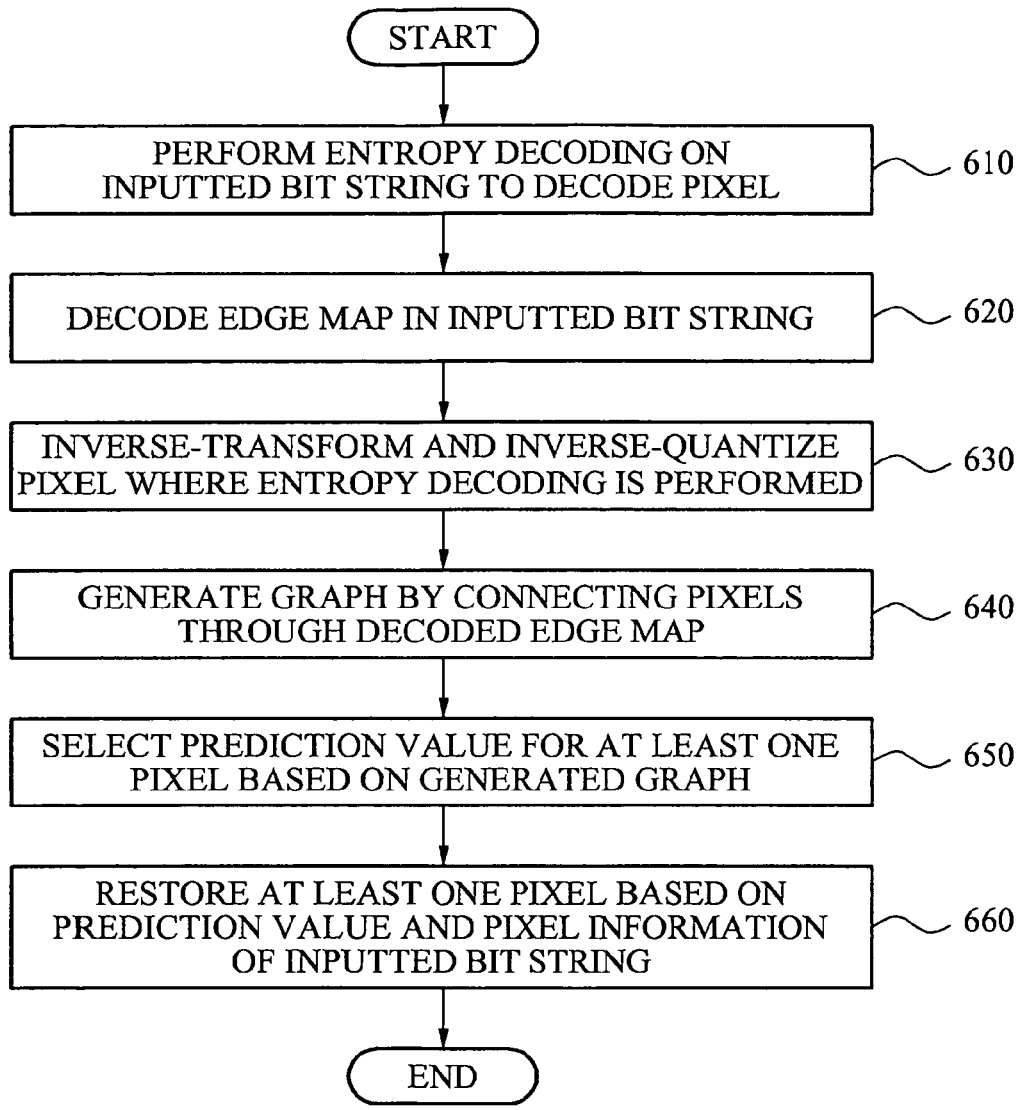
FIG. 6 is a flowchart illustrating a decoding method according to an embodiment.

FIG. 6 is a flowchart illustrating a decoding method according to an embodiment. The decoding method may be performed by the decoding system of FIG. 5. The decoding method may be described based on a process where each of operations is performed by the decoding system.

In operation 610, the decoding system may perform an entropy decoding on an inputted bit string to decode a pixel.

In operation 620, the decoding system may decode an edge map in the inputted bit string. In this instance, the decoding system may decode the edge map from the inputted bit string using a binary arithmetic decoding method.

In operation 630, the decoding system may inverse-transform and inverse-quantize the pixel where the entropy decoding is performed. Specifically, the decoding system may restore an original pixel value prior to the entropy encoding, the transformation, and the quantization described in FIGS. 1 and 4 by performing the entropy decoding, the inverse-transformation, and the inverse-quantization on the bit string inputted through operations 610 and 630.

In operation 640, the decoding system may generate a graph by connecting pixels using a decoded edge map. In this instance, the decoding system may generate the graph by connecting a plurality of pixels being inseparable from each other by an edge of the edge map. That is, a method of generating the graph may be the same as those described in FIGS. 1 and 4.

In operation 650, the decoding system may select a prediction value for at least one pixel based on the generated graph. In this instance, an image corresponding to the inputted bit string may be classified into blocks each having a predetermined pixel size, and the decoding system may select, as the prediction value, a pixel value of a pixel neighboring a block including the at least one pixel and closest to the at least one pixel from among pixels connected to the at least one pixel by the graph. Alternatively, the decoding system may assign mutually different weights to pixel values of pixels connected to the at least one pixel by the graph, and select, as the prediction value, an operation result between the pixel values where the mutually different weights are assigned. In this instance, the pixels connected to the at least one pixel may neighbor a block including the at least one pixel. Specifically, a method of selecting the prediction value may be the same as those described in FIGS. 1 and 4.

Also, the decoding system may select the prediction value for the at least one pixel based on pixels neighboring a block including the at least one pixel from among the inverse-transformed and inverse-quantized pixels. Specifically, as the pixels neighboring the block, corresponding pixels, from among the inverse-transformed and inverse-quantized pixels, may be used.

In operation 660, the decoding system may restore the at least one pixel based on the prediction value and pixel information of the inputted bit string. Specifically, the pixel information of the bit string may be a value including a difference value between an original pixel value and the prediction value, and the decoding system may add the prediction value to the difference value, thereby decoding the at least one pixel.

Descriptions omitted in FIGS. 5 and 6 may refer to the descriptions of FIGS. 1 and 4.

Hereinafter, a method of synthesizing an image using a depth map to encode a 3D image will be described. In this case, the encoding/decoding system and method according to embodiments may be effectively used in compressing the depth map. In this instance, when using a graph-based prediction method and existing prediction methods (for example, a 4×4 spatial prediction method used in an H.264, 16×16 spatial prediction method, and various temporal prediction methods), an optimal prediction method may need to be determined to be used. To determine the optimal prediction method, a method where a rate-distortion cost may be calculated based on a corresponding bit rate and distortion generated due to the corresponding bit rate, and the calculated rate-distortion cost is a minimum may be selected to be used. To calculate the rate-distortion cost, a Lagrange optimal method represented as Equation 6 below may be used.

$$L=D+\lambda R \qquad \text{[Equation 6]}$$

Here, 'D' denotes a distortion value, 'R' denotes a bit rate, and 'λ' denotes a Lagrangian coefficient. In this instance, in embodiments, a distortion value generated by lossy encoding the depth map may not be directly used to calculate the distortion value, an influence exerted on a synthesized image due to the distortion value may be predicted to obtain a prediction value, and the prediction value may be used. This is because the depth map may not be displayed to a user when the depth map is applied to a 3D image, and the depth map may be used only for synthesizing the image. Thus, preferably, the distortion value generated in the synthesized image displayed to the user may be used to perform an optimization. However, to perform the optimization, a method of calculating the distortion value by synthesizing the image with respect to each of the prediction methods may have limitations due to its complexity when being actually utilized. Thus, the distortion generated in the synthesized image may be predicted using the distortion generated in the depth map to obtain a prediction value, so that a more accurate optimization may be performed using the prediction value.

In this instance, the distortion value generated in the synthesized image may be predicted using a difference between a pixel value of an image positioned in the same position as a pixel position of the depth map to be encoded and a pixel value moved, from the same position, by a displacement generated by multiplying a weight by a distortion value generated in a pixel value of the depth map. In this case, the weight used for calculating the displacement may be obtained based on an inertial coefficient such as a focal distance of a camera used for generating a 3D image, an external coefficient indicating a position and an angle of the camera, information about a maximal depth and a minimal depth of the generated 3D image, and the like.

Also, when one of the graph-based prediction method and the existing prediction methods is selected and used to compress the depth map, an optimal prediction method may be determined using the prediction value obtained by predicting the distortion value generated in the synthesized image. Specifically, when calculating the rate-distortion cost with respect to each of the prediction methods using the Lagrange optimal method, the rate-distortion cost may be calculated using the predicted distortion value, and the prediction method having the smallest rate-distortion cost may be selected as the optimal prediction method to be used.

Figure 7:
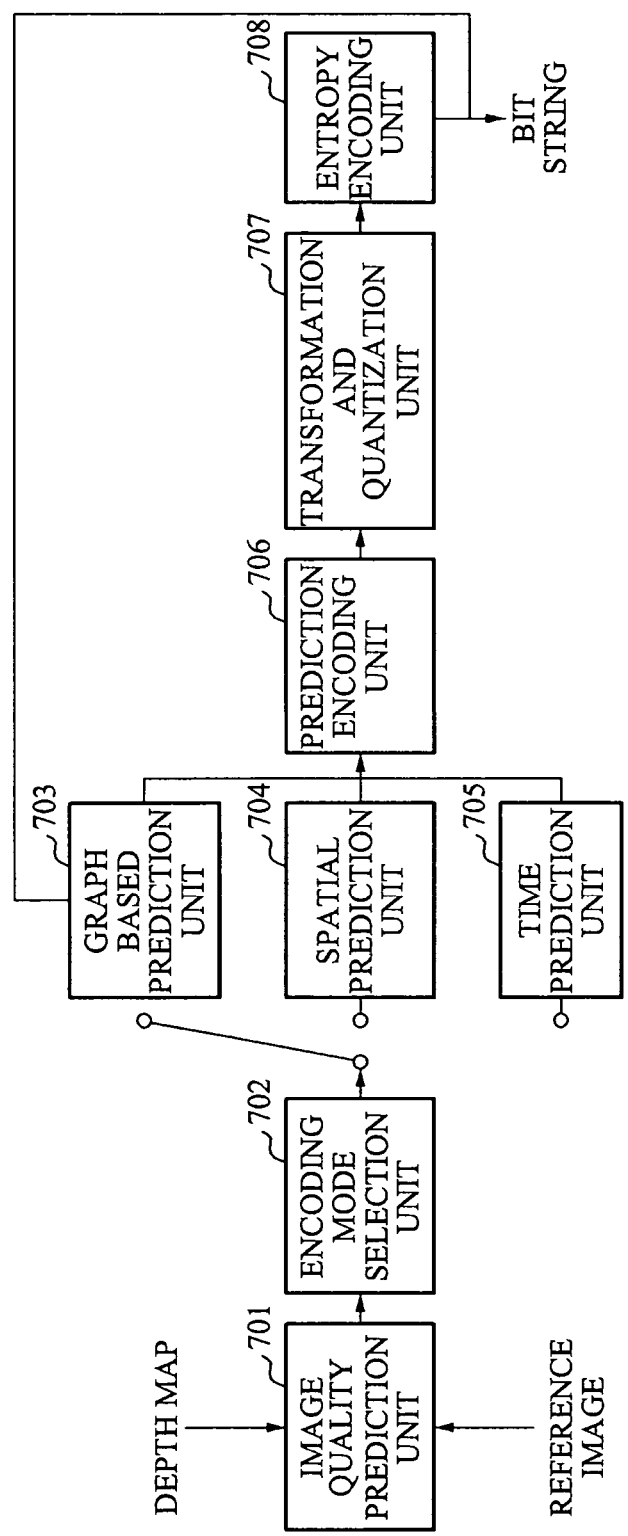
FIG. 7 is a block diagram illustrating an internal configuration of a depth map encoding system according to an embodiment.

FIG. 7 is a block diagram illustrating an encoding system using a depth map according to an embodiment. As illustrated in FIG. 7, the depth map encoding system includes an image quality prediction unit 701, an encoding mode selection unit 702, a graph based prediction unit 703, a spatial prediction unit 704, a temporal prediction unit 705, a prediction encoding unit 706, a transformation and quantization unit 707, and an entropy encoding unit 708.

The image quality prediction unit 701 may predict an image quality of an image to be synthesized using the depth map based on a depth map and a reference image. In this instance, the image quality prediction unit 701 may calculate a distortion value generated in the image to be synthesized, using a difference between a first pixel value of the reference image positioned in the same position as a pixel position of the depth map and a second pixel value moved, from the same position, by a displacement generated by assigning a weight to a distortion value generated in a pixel value of the depth map.

In this case, the weight may be obtained based on the inertial coefficient such as the focal distance of a camera used for generating the 3D image, the external coefficient indicating a position and an angle of the camera, information about a maximal depth and a minimal depth of the generated 3D image, and the like.

The encoding mode selection unit 702 may select an encoding mode based on the predicted image quality. In this instance, the encoding mode selection unit 702 may calculate a rate-distortion cost based on the distortion value, and select the encoding mode having a value where the calculated rate-distortion cost is a minimum.

Here, the encoding mode may include at least two of a graph-based prediction mode, a spatial prediction mode, and a temporal prediction mode. Specifically, when the graph-based prediction mode is selected in the encoding mode selection unit 702, the graph-based prediction unit 703 may be operated, and when the spatial prediction mode is selected, the spatial prediction unit 704 may be operated. Also, when the temporal prediction mode is selected, the temporal prediction unit 705 may be operated.

In this instance, the graph-based prediction mode may generate an edge map based on a pixel value difference between neighboring pixels in an image to be synthesized, generate a graph by connecting pixels using the generated edge map, and select a prediction value for at least one pixel based on the generated graph. Specifically, the graph based prediction unit 703 may further include the edge map generation unit 101, the graph generation unit 102, and the prediction value selection unit 103 which are described in FIG. 1. Also, the graph based prediction unit 703 may further include the edge map encoding unit 109. Also, in this case, the prediction encoding unit 706, the transformation and quantization unit 707, and the entropy encoding unit 708 may respectively correspond to the prediction encoding unit 104, the transformation and quantization unit 105, the entropy encoding unit 106.

Figure 8:
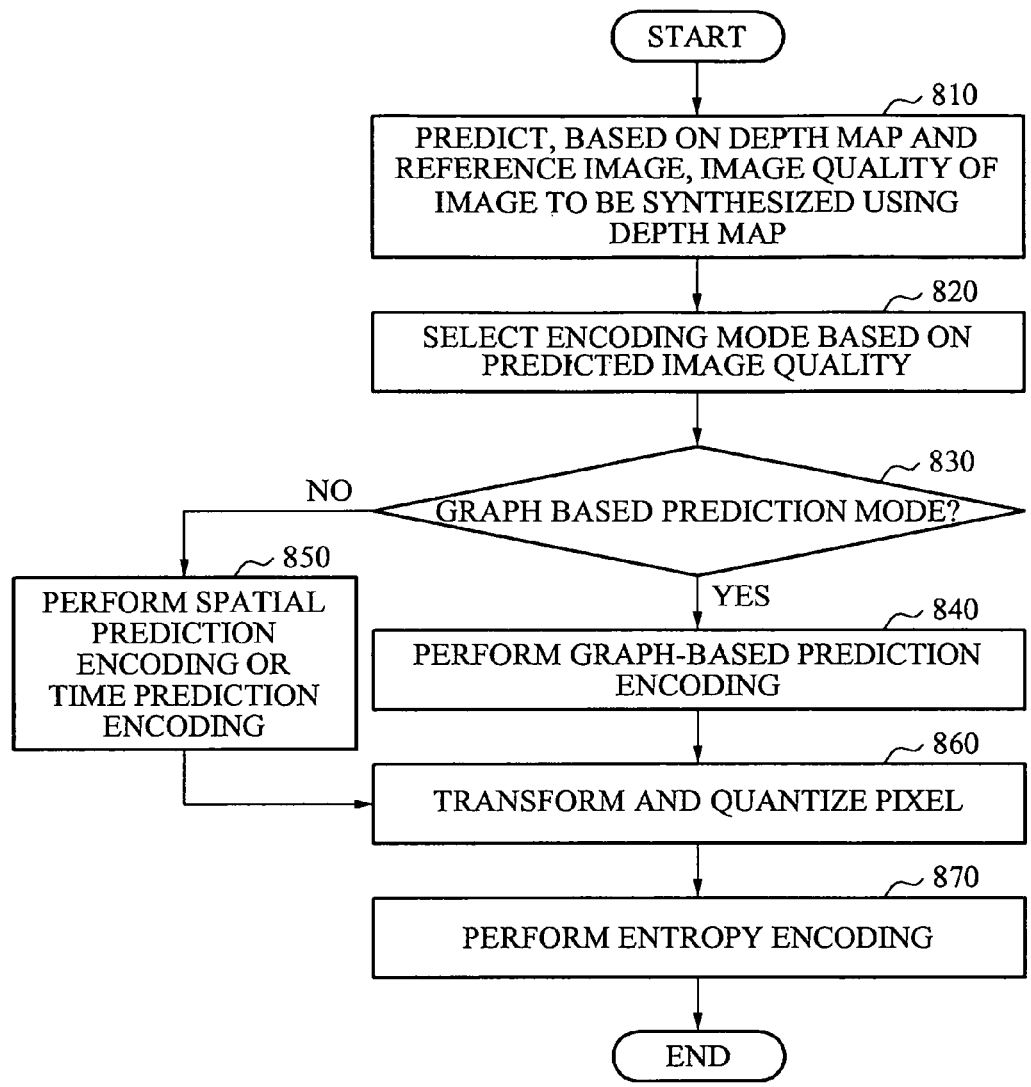
FIG. 8 is a flowchart illustrating a depth map encoding method according to an embodiment.

FIG. 8 is a flowchart illustrating a depth map encoding method according to an embodiment. The depth map encoding method may be performed by the encoding system of FIG. 7. The depth map encoding method will be described based on a process where each of operations is performed by the depth map encoding system.

In operation 810, the depth map encoding system may predict an image quality of an image to be synthesized, using a depth map based on a depth map and a reference image. In this instance, the depth map encoding system may calculate a distortion value generated in the image to be synthesized, using a difference between a first pixel value of the reference image positioned in the same position as a pixel position of the depth map and a second pixel value moved, from the same position, by a displacement generated by assigning a weight to a distortion value generated in a pixel value of the depth map.

In this case, the weight used for calculating the displacement may be obtained based on an inertial coefficient such as a focal distance of a camera used for generating a 3D image, an external coefficient indicating a position and an angle of the camera, information about a maximal depth and a minimal depth of the generated 3D image, and the like.

In operation 820, the depth map encoding system may select an encoding mode based on the predicted image quality. In this instance, the depth map encoding system may calculate a rate-distortion cost based on the distortion value, and select the encoding mode having a value where the calculated rate-distortion cost is a minimum. Here, the encoding mode may include at least one of a graph-based prediction mode, a spatial prediction mode, and a temporal prediction mode.

In operation 830, the depth map encoding system may determine whether the selected encoding mode is the graph-based prediction mode. Specifically, when the selected encoding mode is the graph-based prediction mode, the depth map encoding system may perform operation 840, and when the selected encoding mode is not the graph-based prediction mode, the depth map encoding system may perform operation 850.

In operation 840, the depth map encoding system may perform a graph-based prediction encoding, and in operation 850, the depth map encoding system may perform a spatial prediction encoding or a temporal prediction encoding. In this instance, operation 840 for the graph-based prediction encoding may include operations 401 to 403 described with reference to FIG. 4.

In operation 860, the depth map encoding system may transform and quantize a pixel where the prediction encoding is performed, and in operation 870, the depth map encoding system may perform an entropy encoding on the transformed and quantized pixel to generate a bit string. Operations 860 and 870 may respective correspond to operations 450 and 460 described with reference to FIG. 4.

Descriptions omitted in FIGS. 7 and 8 may refer to the descriptions of FIGS. 1 and 6.

Figure 9:
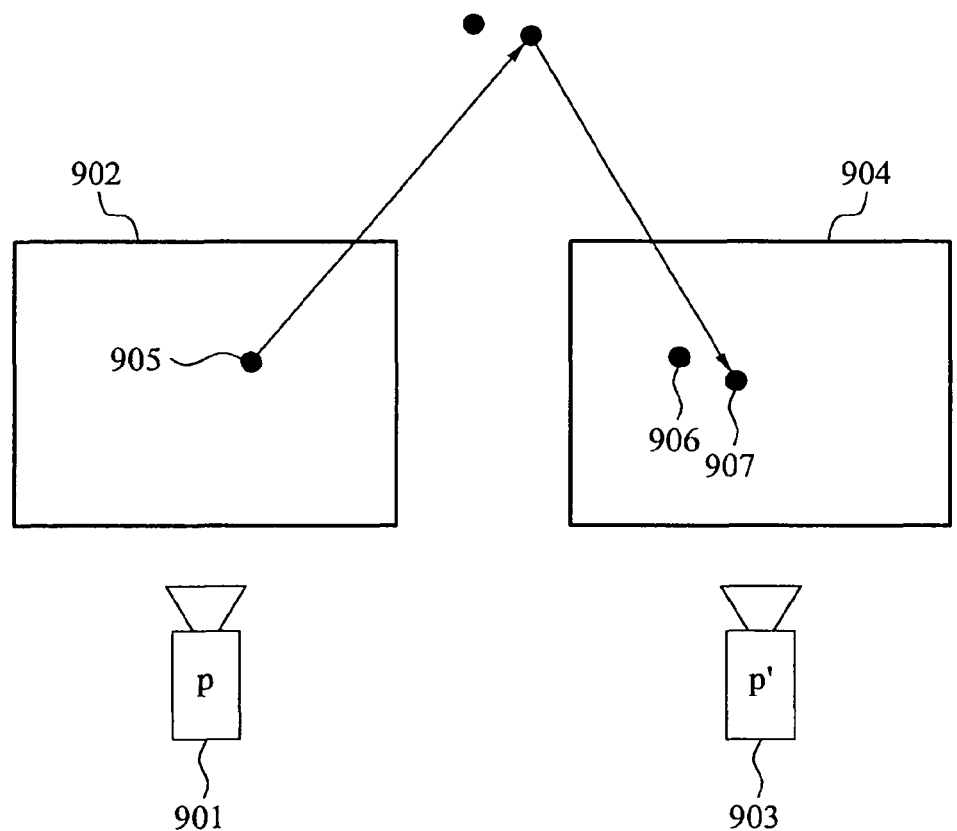
FIG. 9 illustrates an example where a distortion generated in a synthesized image is estimated using a distortion of a depth map according to an embodiment.

FIG. 9 illustrates an example where a distortion generated in a synthesized image is estimated using a distortion of a depth map according to an embodiment.

When synthesizing from an image 902 obtained in a position of a camera (p) 901 to an image 904 obtained in a position of a camera (p') 903, a pixel of a first position $(x_{im}, y_{im})$ 905 may be mapped to a second position $(x'_{im}, y'_{im})$ 906 in a case where an error in the depth map does not occur. However, in a case where the error in the depth map occurs, the pixel of the first position $(x_{im}, y_{im})$ 905 may be moved by a displacement (tx, ty) to be mapped to a third position $(x'_{im+tx}, y'_{im+ty})$ 907. Accordingly, a distortion value may be calculated using a pixel value difference between the first position $(x_{im}, y_{im})$ 905 and the third position $(x'_{im+tx}, y'_{im+ty})$ 907 in the image obtained from the position of the camera (p) 901.

As described above, according to embodiments, a pixel prediction may be effectively performed based on information about regions of an image, using the graph, to improve compression efficiency, so that an image quality of the restored image may be improved while reducing a compressed bit rate. Also, when encoding a 3D image in an image synthesizing scheme performed using the depth map, an influence exerted on the synthesized image due to the distortion value generated when the depth map is lossy encoded may be predicted to determine an optimized encoding mode.

The methods according to the above-described embodiments may be recorded in computer-readable non-transitory storage media including program instructions to implement various operations embodied by a computer. The media may also include, alone or in combination with the program instructions, data files, data structures, and the like. Examples of computer-readable non-transitory media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. A decoding system, comprising:
   an edge map decoding unit to decode an edge map in an inputted bit string;
   a graph generation unit to generate a graph by connecting pixels through the decoded edge map;
   a prediction value selection unit to select a prediction value for at least one pixel based on the generated graph; and
   a prediction compensation unit to restore the at least one pixel based on the prediction value and pixel information of the inputted bit string.

2. The decoding system of claim 1, wherein the edge map decoding unit decodes the edge map from the inputted bit string using a binary arithmetic decoding scheme.

3. The decoding system of claim 1, wherein the graph generation unit generates the graph by connecting a plurality of pixels being inseparable from each other by an edge of the edge map.

4. The decoding system of claim 1, wherein an image corresponding to the inputted bit string is classified into blocks each having a predetermined pixel size, and the prediction value selection unit selects, as the prediction value, a pixel value of a pixel neighboring a block including the at least one pixel and closest to the at least one pixel from among pixels connected to the at least one pixel by the graph.

5. The decoding system of claim 1, wherein an image corresponding to the inputted bit string is classified into blocks each having a predetermined pixel size, and the prediction value selection unit assigns mutually different weights to pixel values of pixels connected to the at least one pixel by the graph, the pixels neighboring a block including the at least one pixel, and selects, as the prediction value, an operation result between the pixel values where the mutually different weights are assigned.

6. The decoding system of claim 1, further comprising:
   an entropy decoding unit to perform an entropy decoding on the inputted bit string to decode the at least one pixel; and
   an inverse transformation and inverse quantization unit to inverse-transform and inverse-quantize the at least one pixel where the entropy decoding is performed.

7. The decoding system of claim 6, wherein an image corresponding to the inputted bit string is classified into blocks having a predetermined pixel size, and the prediction value selection unit selects the prediction value for the at least one pixel based on a pixel neighboring a block including the at least one pixel, from among the inverse-transformed or inverse-quantized pixels, and based on the graph.

8. A decoding method, comprising:
   decoding an edge map from an inputted bit string;
   generating a graph by connecting pixels through the decoded edge map;
   selecting a prediction value for at least one pixel based on the generated graph; and
   restoring the at least one pixel based on the prediction value and pixel information of the inputted bit string.

* * * * *